United States Patent [19]

Padula

[11] Patent Number: 5,725,023

[45] Date of Patent: Mar. 10, 1998

[54] POWER STEERING SYSTEM AND CONTROL VALVE

[75] Inventor: Santo Anthony Padula, Lake Orion, Mich.

[73] Assignee: Lectron Products, Inc., Rochester Hills, Mich.

[21] Appl. No.: 391,542

[22] Filed: Feb. 21, 1995

[51] Int. Cl.$^6$ ............................................. F17D 3/00
[52] U.S. Cl. ............................ 137/596.17; 180/422
[58] Field of Search ............................ 180/422, 423; 137/596.17

[56] References Cited

U.S. PATENT DOCUMENTS

| | | | |
|---|---|---|---|
| 2,633,871 | 4/1953 | Parsons | 137/596.17 |
| 2,758,447 | 8/1956 | Prosek | 137/596.17 |
| 2,759,459 | 8/1956 | Lucien | 137/596.17 |
| 2,821,997 | 2/1958 | Clay et al. | 137/596.17 |
| 3,593,241 | 7/1971 | Ludwig . | |
| 3,598,360 | 8/1971 | Merriner et al. . | |
| 4,301,715 | 11/1981 | Acar | 137/596.17 |
| 4,369,696 | 1/1983 | Klatt et al. | 137/596.17 |
| 4,471,811 | 9/1984 | Kawabata et al. . | |
| 4,529,006 | 7/1985 | Block et al. | 137/596.17 |
| 4,530,414 | 7/1985 | Fukino et al. | 180/422 |
| 4,535,810 | 8/1985 | Duder et al. | 137/596.17 |
| 4,557,342 | 12/1985 | Drutchas | 180/422 |
| 4,561,345 | 12/1985 | Blohm et al. | 137/596.17 |
| 4,580,651 | 4/1986 | Adams | 180/422 |
| 4,584,488 | 4/1986 | Towers et al. | 180/422 |
| 4,624,336 | 11/1986 | Eddy | 180/422 |
| 4,627,509 | 12/1986 | Adams et al. | 180/422 |
| 4,629,025 | 12/1986 | Brasier et al. . | |
| 4,643,227 | 2/1987 | Suzuki et al. . | |
| 4,690,233 | 9/1987 | Daido . | |
| 4,697,608 | 10/1987 | Kolze et al. . | |
| 4,708,220 | 11/1987 | Noto et al. | 180/422 |
| 4,712,767 | 12/1987 | Losser et al. . | |
| 4,744,389 | 5/1988 | Ichihashi . | |
| 4,745,985 | 5/1988 | Nakayama et al. | 180/422 |
| 4,760,892 | 8/1988 | Duffy | 180/422 |
| 4,805,870 | 2/1989 | Mertz . | |
| 4,828,065 | 5/1989 | Ishihara et al. . | |
| 4,863,143 | 9/1989 | Cowley et al. . | |
| 4,876,899 | 10/1989 | Strott et al. . | |
| 4,877,099 | 10/1989 | Duffy | 180/142 |
| 4,896,544 | 1/1990 | Garshelis . | |
| 5,018,431 | 5/1991 | Gray et al. | 137/596.17 |

(List continued on next page.)

OTHER PUBLICATIONS

Terrence Lynch, *Socket Wrench Extension Senses Torque*, Design News, Aug. 2, 1993, pp. 86–87.

Terry Holland, *A New Magnetoelastic Torque Transducer*, Sensors, Mar. 1993, pp. 76–78.

McGraw-Hill Encyclopedia of Science & Technology, *Automotive Steering*, © 1987, pp. 263–265.

William K. Toboldt, Larry Johnson, Steven W. Olive, Goodheart-Wilcox Automotive Encyclopedia, © 1989, pp. 577–587.

Bosch, *Automotive Handbook*, 201 1993, pp. 728–733.

A. K. Legg, Saab Owners Workshop Manual, © 1986, p. 223.

*Primary Examiner*—F. Daniel Lopez
*Attorney, Agent, or Firm*—Harness, Dickey & Pierce, P.L.C.

[57] ABSTRACT

A power steering system employs a valve which directly controls the direction of flow of steering fluid and the degree of pressure of the steering fluid. In another aspect of the present invention, a sensor is used to detect steering wheel induced torque. The sensor supplies a signal to an electrical control unit which, in turn, sends a signal to an electromagnetic device controlling a spool within a valve. In a further aspect of the present invention, a non-rotary valve controls steering fluid pressure and flow through left and right turn assist outlets. In still another aspect of the present invention, a valve employs a pair of bores within which spools are linearly movable by electromagnetic devices. In yet another aspect of the present invention, a valve is provided for controlling the magnitude and direction of steering fluid pressure and flow to a steering cylinder; the valve is not mechanically engaged with a rotating member of the steering system.

29 Claims, 5 Drawing Sheets

U.S. PATENT DOCUMENTS

| | | |
|---|---|---|
| 5,048,630 | 9/1991 | Schaffer .................................... 180/422 |
| 5,050,840 | 9/1991 | Kondo et al. . |
| 5,094,264 | 3/1992 | Miller . |
| 5,102,095 | 4/1992 | Schmitt-Matzen et al. . |
| 5,133,424 | 7/1992 | Fox et al. . |
| 5,145,148 | 9/1992 | Laurent . |
| 5,207,780 | 5/1993 | Norimatsu et al. . |
| 5,218,989 | 6/1993 | Kunimoto . |
| 5,261,637 | 11/1993 | Curnow . |
| 5,307,892 | 5/1994 | Phillips . |
| 5,351,555 | 10/1994 | Garshelis . |
| 5,373,911 | 12/1994 | Yasui ...................................... 180/422 |

POWER STEERING SYSTEM AND CONTROL VALVE

BACKGROUND OF THE INVENTION

This invention relates generally to power steering and specifically to a power steering system employing a control valve and sensor.

Power steering systems are used in automotive vehicles to augment the manual steering effort provided by the vehicle driver. Automotive vehicle power steering is actually power assisted steering. Most systems are constructed so that the car can be steered manually when the engine is not running or if any failure occurs at the power source. Virtually, all power steering systems require a power steering pump attached to the engine and driven by a belt, a hydraulic cylinder and a control valve for controlling fluid flow therebetween. The control valve is also coupled to the pump by a plurality of pressure hoses and a return hose.

Many conventional systems employ a four-way open-center rotary control valve having follow along position feedback in which road feel is artificially induced by deflection of a torsion bar. Other power steering systems typically employ a four-way open-center reaction control valve also having follow along position feedback wherein road feel is induced directly via hydraulic reaction forces.

Traditional control valves are mechanically coupled to a steering shaft or torsion bar, and are typically located just ahead of the vehicle's steering gear assembly. Unfortunately, this placement often results in compromised static and dynamic performance of the power steering system. For example, such power steering systems may generate poor response during lower steering wheel torque inputs and/or generate excessive response to small changes in the steering wheel torque input at higher levels. Dynamically, some conventional power steering systems are also subject to sluggish behavior which produces a response that is delayed beyond normally anticipated human perception times. In addition, some of these traditional power steering systems are subject to undesirably rapid steering wheel motion without a concurrent increase in steering wheel torque thereby exhibiting unstable motion rates.

More recently, power steering systems have included speed sensitive steering. In general, most speed sensitive systems increase manual steering forces or driver feel at high vehicular speeds by reducing hydraulic fluid flow through the control valves in order to reduce valve gain. Examples of conventional variable assist power steering systems are described in U.S. Pat. Nos. 5,133,424 entitled "Variable Assist Power Steering Control Valve" which issued to Fox on Jul. 28, 1992, and 4,877,099 entitled "Electronically Controlled Variable Assist Power Steering System" which issued to Duffy on Oct. 31, 1989; both of these patents are incorporated by reference herewithin.

Typical rotary valve equipped power steering systems have substantially nonlinear static performance characteristics. Unexpectedly small changes in the output force are commensurate with given changes in steering wheel torque at low output force levels while unexpectedly large changes of output force are commensurate with given changes in steering wheel torque at high output force levels. Both conditions can result in excessive steering wheel motion with respect to the predetermined amount of rotation motion anticipated by the driver. In the low output force condition, rotational compliance inherent in rotary valves result in relatively large steering wheel motions before the required output force levels are obtained. While in the high output force condition, lack of any apparent tactile input torque modulation often results in over-correction of the steering wheel's position.

In many cases, rotary valve equipped power steering systems also produce relatively slow response at low output force levels. This is indirectly the result of the method employed for achieving overall closed-loop stability of the system. The driver of a vehicle having rotary valve power steering is unable to exert fine direction control over the vehicle under transient conditions such as ruts in the road or side wind gusts, as a result of the poor response at low steering forces. Reaction valves have also proven problematic by not providing sufficient driver feel during high speed turning.

Other variable assist power steering systems are discussed in the following U.S. Pat. Nos.: 5,307,892 entitled "Electronically Controlled Power Steering System" which issued to Phillips on May 3, 1994; 5,207,780 entitled "Hydraulic Valve Device for Automotive Power Steering Gear" which issued to Norimatsu et al. on May 4, 1993; 4,828,065 entitled "Electronically Controlled Power Steering System" which issued to Ishihara et al. on May 9, 1989; 4,471,811 entitled "Linear Solenoid-Operated Valve For Use in Power Steering System" which issued to Kawabata et al. on Sep. 18, 1984; and, 4,643,227 entitled "Linear Solenoid-Operated Valve for Use in Power Steering System" which issued to Suzuki et al. on Feb. 17, 1987. All of these constructions employ a rotary steering valve and most use a second solenoid-operated pressure throttling valve.

SUMMARY OF THE INVENTION

In accordance with the present invention, the preferred embodiment of a power steering system employs a valve which directly controls the direction of flow of steering fluid and the degree of pressure of the steering fluid. In another aspect of the present invention, a sensor is used to detect steering wheel induced torque. The sensor supplies a signal to an electrical control unit which, in turn, sends a signal to an electromagnetic device controlling a spool within a valve. In a further aspect of the present invention, a non-rotary valve controls steering fluid pressure and flow through left and right turn assist outlets. In still another aspect of the present invention, a valve employs a pair of bores within which spools are linearly movable by electromagnetic devices. In yet another aspect of the present invention, a valve is provided for controlling the magnitude and direction of steering fluid pressure and flow to a steering cylinder; the valve is not mechanically engaged with a rotating member of the steering system.

The electronically variable pressure power steering system of the present invention is advantageous over traditional constructions in that the present invention allows for a standardized valve to be used in both luxury vehicles desirous of a soft steering feel and sports cars desirous of a firmer feel. The present invention power steering system also provides for quick and low cost changes to valve performance and pressure settings without physical valve modifications. Another advantage of the present invention is that a single valve is operable for controlling the direction of steering fluid flow and the degree of pressure of the steering fluid. The power steering system of the present invention is further advantageous by only interfacing with a rotatable member in an electrical and not mechanical manner; this allows for placement of the valve in a number of locations other than immediately adjacent to a torsion bar or pinion gear. This nonmechanical interface also achieves reduced friction and artificial feel along the torsion rod, and in turn, the steering wheel as perceived by the vehicle driver. A further advantage of the present invention power steering system is that the valve is easily manufactured and installed into the vehicle without necessitating expensive fine tuning and machining to account for part variations. Additional advantages and features of the present invention will become apparent from the following description and appended claims, taken in conjunction with the accompanying drawings.

DETAILED DESCRIPTION OF THE PREFERRED EMBODIMENTS

Figures 1, 2:
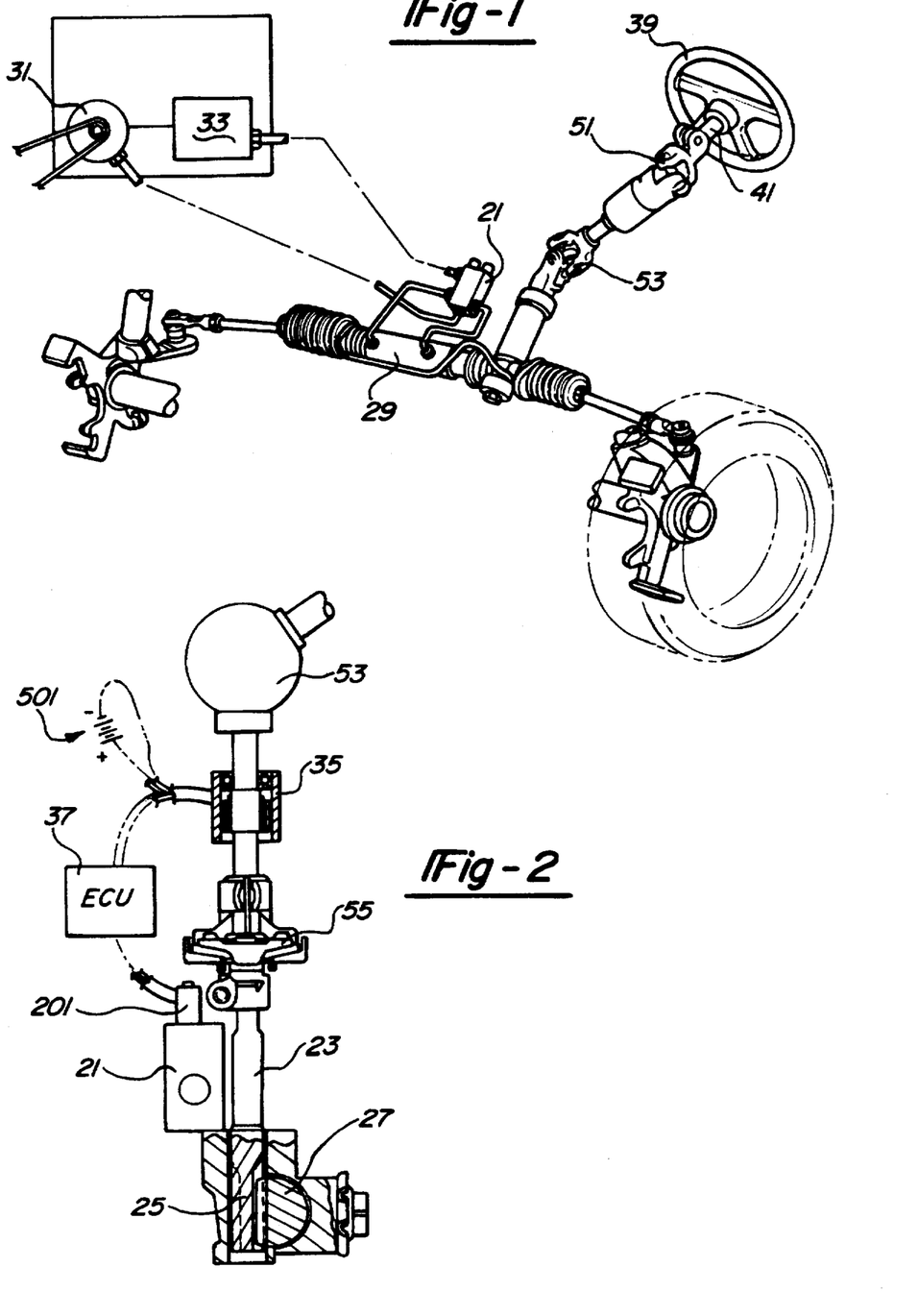
FIG. 1 is a perspective view, partially in diagrammatic form, showing the preferred embodiment power steering system of the present invention.
FIG. 2 is a side elevational view, partially in diagrammatic form, showing the preferred embodiment power steering system of the present invention employing a first preferred embodiment control valve.

The preferred embodiment electronically variable pressure power steering system of the present invention is shown in FIGS. 1 and 2. The power steering system includes a control valve 21, a non-compliant pinion shaft 23, a pinion gear 25, a rack 27, a steering cylinder 29, a steering pump 31, a steering fluid reservoir 33, a sensor 35, an electrical control unit 37 and a driver accessible steering wheel 39. Steering wheel 39 has a steering shaft 41 fastened thereto coupled to pinion shaft 23 through a plurality of couplings 51, 53 and 55. Thus, when the driver turns steering wheel 39, steering shaft 41, pinion shaft 23 and pinion gear 25 will rotate in concert therewith. Pinion gear 25 is enmeshed with a toothed segment of rack 27 such that rotational movement of pinion shaft 23 is translated into linear movement of rack 27 within steering cylinder 29. This rack and pinion assembly is of a conventional type employing an integral piston coupled for movement with rack 27. Valve 21 of the present invention directs power steering fluid flow and controls the fluid pressure to reduce steering effort. The difference in steering fluid pressure on either side of the piston assists movement of rack 27, thereby selectively supplementing the manual forces applied through the mechanical interface between rack 27 and pinion gear 25 and reducing turning efforts. The fluid in the oppositely compressed portion of steering cylinder 29 is forced back into valve 21 and onto reservoir 33. When the steering effort stops, control valve 21 causes pressure to be equalized on both sides of the piston such that the front wheels return to a straight ahead or neutral position.

Figure 3:
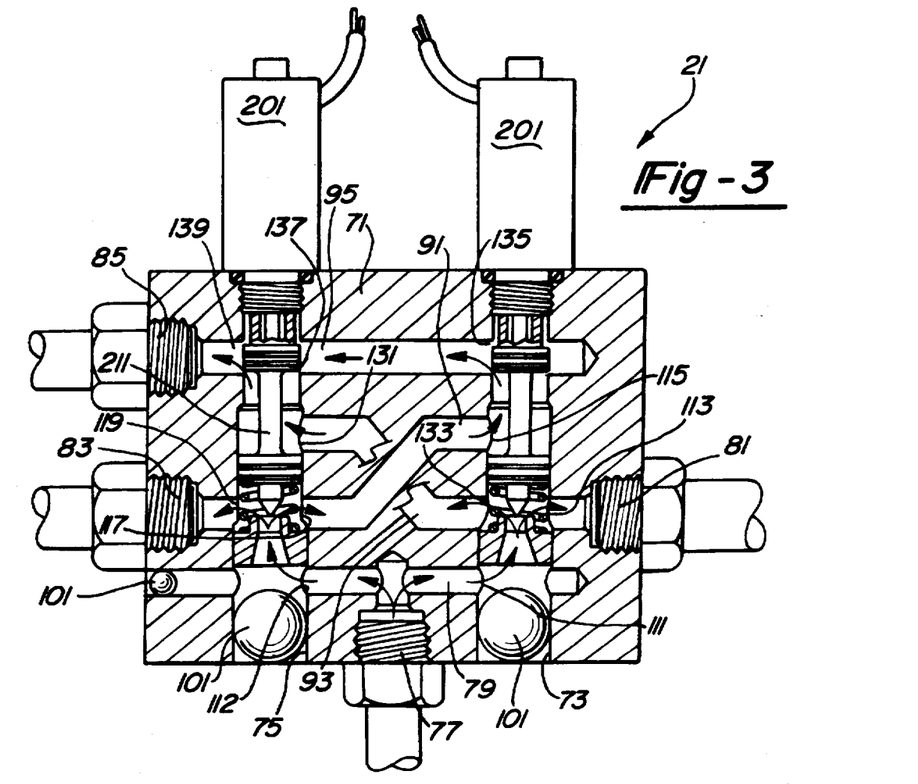
FIG. 3 is a cross sectional view showing the first preferred embodiment control valve employed in the power steering system of the present invention, illustrated in a neutral position.
Figure 4:
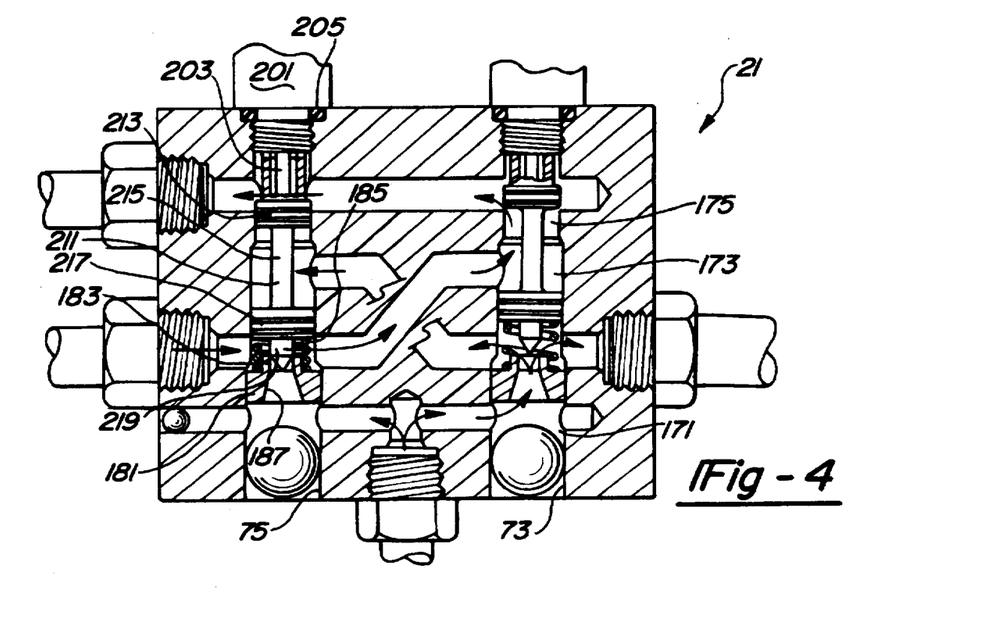
FIG. 4 is a cross sectional view showing the first preferred embodiment control valve employed in the power steering system of the present invention, illustrated in a right turn assist position.

A first preferred embodiment valve 21 employed in the present invention power steering system is illustrated in FIGS. 3 and 4. FIG. 3 shows valve 21 in a fully open neutral position such that there is no power turning assist provided. A right turn power assisted position of valve 21 is shown in FIG. 4.

Valve 21 has a valve body 71 with first and second bores 73 and 75, respectively, disposed therein in a parallel manner. A supply inlet 77 and a T-shaped supply passageway 79 are also disposed within body 71. A right turn assist outlet 81, a left turn assist outlet 83 and a return outlet 85 are further disposed within body 71. It should be noted that turn assist outlets 81 and 83 can also act as inlets during certain operational modes. Hoses or other conduits are coupled to the inlet and outlets. First and second exchange passageways, respectively 91 and 93, as well as a return passageway 95 are additionally located within body 71. Body 71 is preferably a one-piece cast iron block having the passageways cast therein. The bores are drilled and then lapped in order to maintain the necessary round tolerance within approximately 0.0005 inches of the dimension desired. Steel balls 101 are press fit within otherwise open ends of bores 73 and 75 and passageway 79. Other sealing means such as threaded caps, elastomeric plugs or other high pressure seals may of course be employed instead of balls 101. Furthermore, a two-piece body could alternately be used so as to eliminate the need for such sealing means.

A portion of supply passageway 79 communicates between supply outlet 77 and a first port 111 of first bore 73. Right turn assist outlet 81 communicates with first bore 73 at a second port 113 while first exchange passageway 91 communicates between a third port 115 of first bore 73 and a second port 117 of second bore 75. First exchange passageway 93 continues through second bore 75 and further communicates between left turn assist outlet 83 and a third port 119 of second bore 75. Another portion of supply passageway 79 communicates with second bore 75 at a first port 112. Second exchange passageway 91 communicates between a fourth port 131 of second bore 75 and a fifth port 133 of first bore 73, then through first bore 73, and between second port 113 of first bore 73 and right turn assist outlet 81. Return passageway 95 communicates between a fourth port 135 of first bore 73 and a fifth port 137 of second bore 75. Return passageway 95 also communicates through second bore 75 then between a sixth port 139 of second bore 75 and return outlet 85.

Bores 73 and 75 have a stepped cylindrical configuration with an enlarged cross sectional lower portion 171, a relatively narrower cross sectional median portion 173 and an even narrower cross sectional upper portion 175. A hardened steel seat 181 is affixed within each bore. Each seat 181 has a cylindrical boss 183 upwardly extending therefrom for supporting a compression spring 185. Seat 181 further has an inside surface 187 defined by a cylindrical upper section and a frusto-conical lower section. The spool interaction with seats 181 will not provide a full metal-to-metal closing off but will affect a variable orifice for controlling the amount of fluid flow therethrough.

A pair of electromagnetic devices or solenoids 201 are threadably affixed to body 71 in coaxial alignment with each bore 73 and 75. Each solenoid 201 is of a fairly conventional design employing a bobbin, frusto-conical stop, conductive wire windings, conductive can and linearly movable plunger 203. Each solenoid 201 is of a pushing variety when energized and can create between approximately 2 and 5 pounds of pushing force when fully energized. Elastomeric seals 205 are also positioned between solenoids 201 and the adjacent bores.

A spool 211 is linearly movable within each bore 73 and 75 in response to the energization of solenoids 201. Each spool 211 includes an upper land 213, a bridge 215, a lower land 217 and a seat interface or poppet 219. Peripheral surfaces of upper and lower lands 213 and 217, respectively, are machined to a tight tolerance so as to seal against the adjacent portions of each bore. Transversely oriented balancing grooves are located along the peripheral surface of the lands 213 and 217 to correct for any spool misalignment; this provides a labyrinth pressure sealing means. Poppet 219 is operably movable to fully seal within cylindrical section of seat 181 when each spool 211 is in its fully closed position. It is important that upper lands 213 shut off the return path prior to fully inserting poppets 219 into seats 181. The pressure created by each spool 211 is the result of the "effective" orifice size of the two parallel orifices of upper land 213 to bore 175 and popper 219 to seat 181, initially, and then the result of poppet 219 to seat 181 alone. The pressure gradient is continuous along the stroke of each spool 211. Spools 211 are preferably made from carbonized hardened steel while seats 181 are preferably made from hardened steel being a few points softer than poppets 219.

Referring to FIG. 3, spools 211 are located in their fully open positions wherein poppets 219 are fully removed from the adjacent seats 181. This allows the steering fluid to flow from supply inlet 77 through supply passageway 79, entirely through each seat 181, to the adjacent turn assist outlet 81 and 83, through exchange passageways 91 and 93, through a clearance between bridges 215 and bores 73 and 75, past upper lands 213, through return passageway 95 and out return outlet 85. When both spools 211 are in their fully open position, the steering fluid is equally directed and minimally pressurized between left and right turn assist outlets as well as the adjacent piston surfaces within steering cylinder 29 (see FIG. 1).

When one spool 211 is in a fully closed position and the other spool 211 is in a fully open position, as is shown in FIG. 4, left turn assist outlet 83 acts as a bypass inlet to allow steering fluid to flow therefrom, through second bore 75, along exchange passageway 91, within clearance between bridge 215 and first bore 73, past upper land 213 adjacent first bore 73, through return passageway 95, past upper land 213 adjacent second bore 75, and out through return outlet 85. This bypass mode allows for steering fluid exiting right turn assist outlet 81 to move the piston and rack 27 associated therewith. Concurrently, steering fluid enters from supply inlet 77, travels along supply passageway 79, is restricted within second bore 75 by the seal between poppet 219 and seat 181, flows through seat 181 within first bore 73, exits through right turn assist outlet 81, travels through exchange passageway 93, and the fluid is trapped within the clearance between the upper and lower lands, respectively 213 and 217, within second bore 75. The specific positioning of FIG. 4 provides full power assist for use in a low speed right turn scenario. The fluid flow is depicted by arrows in the figure. A left turn assist would be in mirrored symmetry to that shown in FIG. 4. Spools 211 can also be individually moved to intermediate positions as well.

Figure 5:
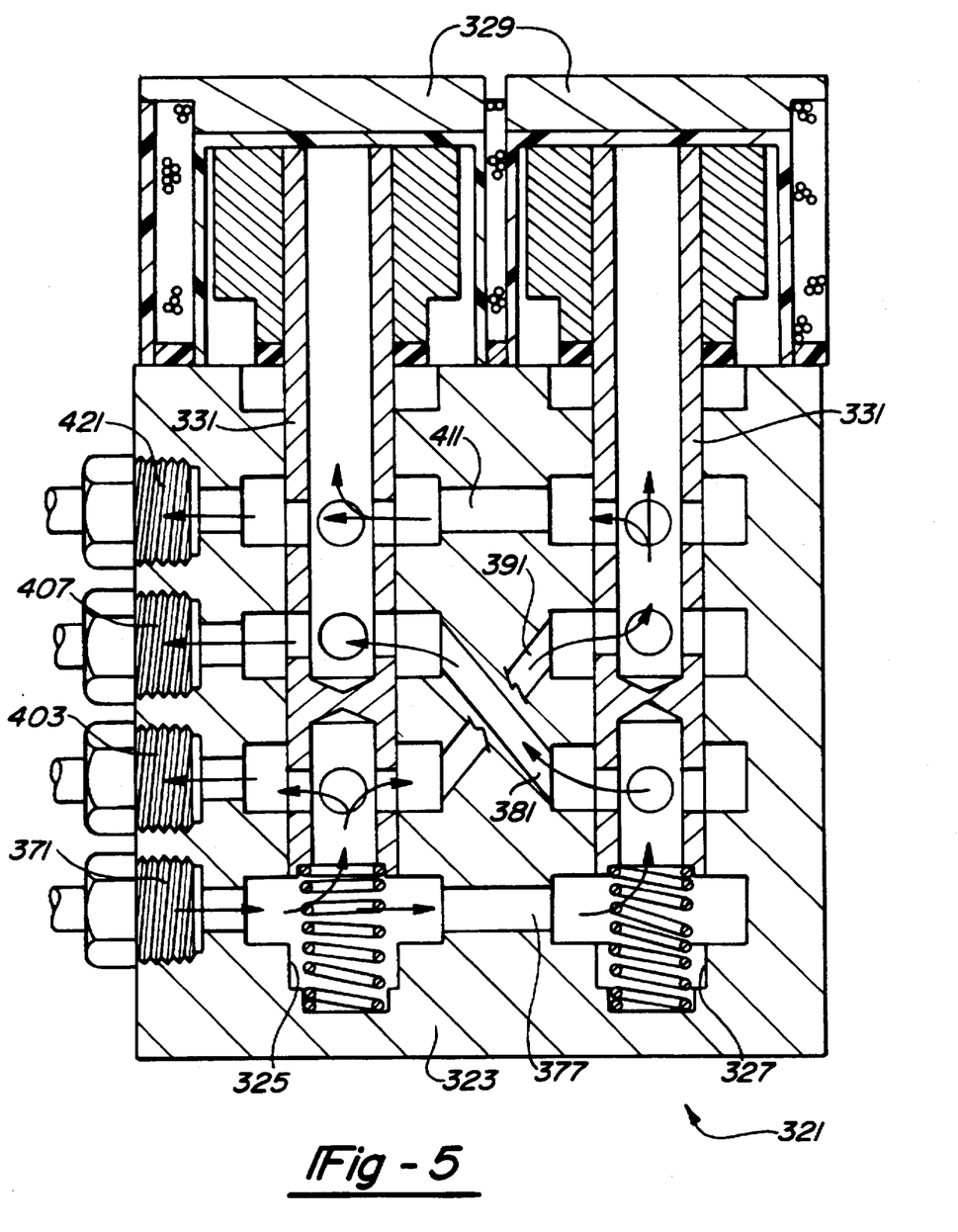
FIG. 5 is a cross sectional view showing a second preferred embodiment control valve employed in the power steering system of the present invention, illustrated in a neutral position.
Figure 6:
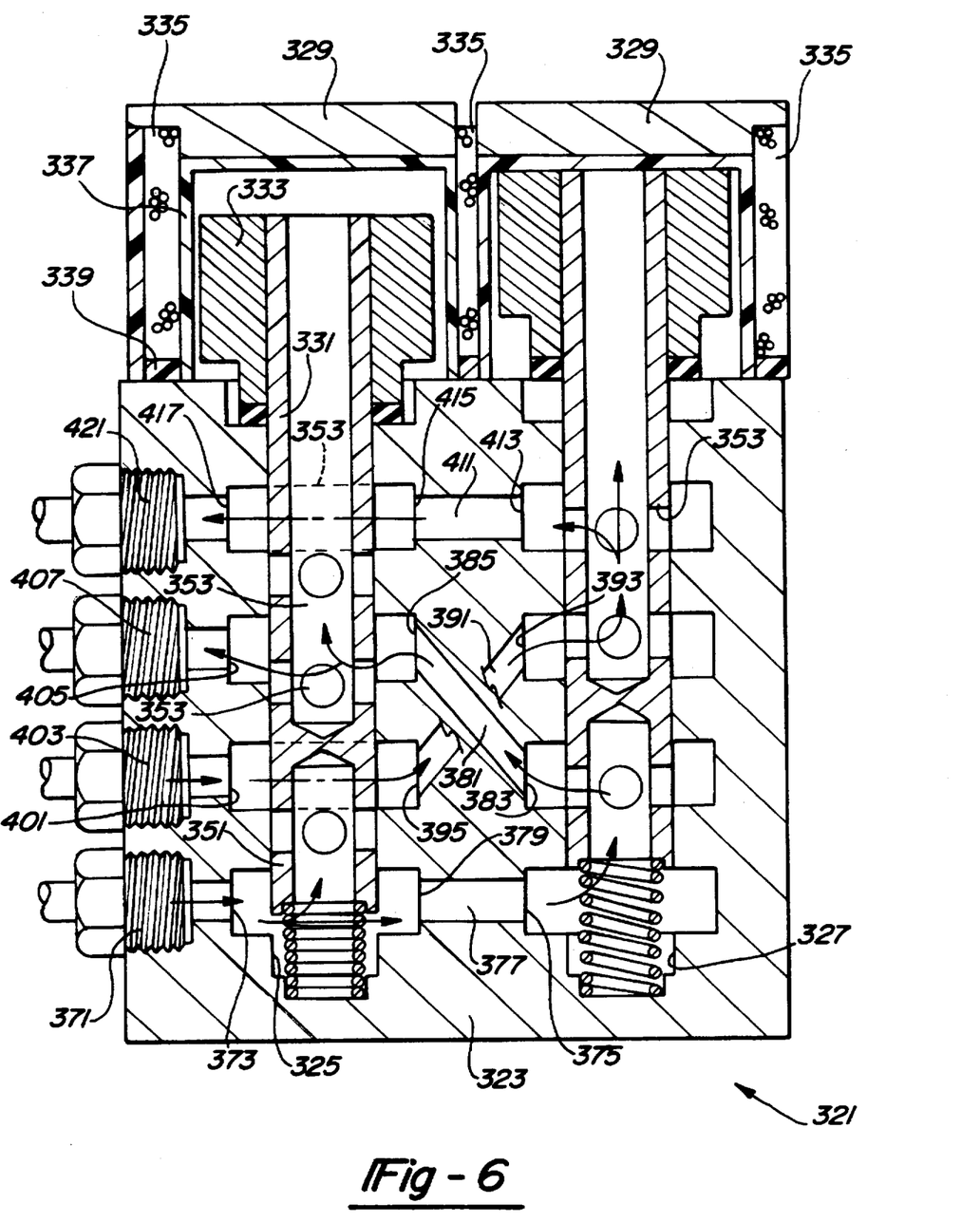
FIG. 6 is a cross sectional view showing the second preferred embodiment control valve employed in the power steering system of the present invention, illustrated in a right turn assist position.

A second preferred embodiment valve 321 can be observed in FIGS. 5 and 6. In this embodiment, valve 321 includes a body 323 with a pair of parallel bores 325 and 327. A pair of electromagnetic devices or solenoids 329 are aligned with bores 325 and 327 such that linearly movable spools 331 are coupled to plungers 333 through a knurled pressfit. Spools 331 have a somewhat cylindrical shape with hollow chambers therein. Each spool 331 has an external surface 351 and a plurality of apertures 353 for allowing fluid to flow therethrough. Within solenoids 329, conductive magnetic wires 335 are positioned upon bobbins 337 so as to surround plunger 333. Elastomeric seals 339 are positioned between solenoids 329 and body 323.

A supply inlet 371 communicates with a first port 373 of first bore 325 and a first port 375 of second bore 327 via a supply passageway 377 and fifth port 379 of first bore 325. A first exchange passageway 381 communicates between a second port 383 of second bore 327 and a sixth port 385 of first bore 325. Similarly, a second exchange passageway 391 communicates between a third port 393 of second bore 327 and a seventh port 395 of first bore 325. A second port 401 of first bore 325, in line with seventh port 395 thereof, communicates between first bore 325 and a left turn assist outlet 403. Likewise, a third port 405 of first bore 325 is aligned with sixth port 385 thereof, and communicates between first bore 325 and a right turn assist outlet 407. A return passageway 411 communicates between a fourth port of 413 of second bore 327 and an eighth port 415 of first bore 325. A fourth port 417 of first bore 325 is aligned with eighth port 415 thereof, and communicates with a return outlet 421. Placement of the inlet and outlets should be designed to ensure compactness of the hose routings.

The fluid flow within valve 321 is best illustrated by the arrows in the figures. When spools 331 are in their fully open position, as is shown in FIG. 5, the steering fluid freely and equally travels from supply inlet 371, up through a lower portion of first bore 325, out left turn assist outlet 403, also through supply passageway 377, up a lower portion of second bore 327, through exchange passageway 381, across first bore 325, out right turn assist outlet 407, also from first bore 325 to exchange passageway 391, up an upper section of second bore 327, along return passageway 411, up an upper portion of first bore 325, across first bore 325 and out return outlet 421.

Referring to FIG. 6, solenoids 329 have acted to close spool 331 within first bore 325 while leaving spool 331 within second bore 327 at its nominally fully open position. Thus, fluid fed in through supply inlet 371 flows past first bore 325, through inlet passageway 377, up a lower portion of second bore 327, along exchange passageway 381, across a middle portion of first bore 325, out right turn assist outlet 407, while traveling up but being blocked within upper and lower portions of first bore 325. Concurrently therewith, steering fluid flows into left turn assist outlet 403 across first bore 325, along exchange passageway 391, up a middle portion of second bore 327 within spool 331, along return passageway 411, across first bore 325 and out return outlet 421, while fluid also travels up an upper portion of second bore 327 until it dead ends therein. Thus, valve 321 provides a bypass therethrough from left turn assist outlet 403 to return outlet 421. Valve 321 thereby provides full right turning pressure and fluid flow direction.

Figure 7:
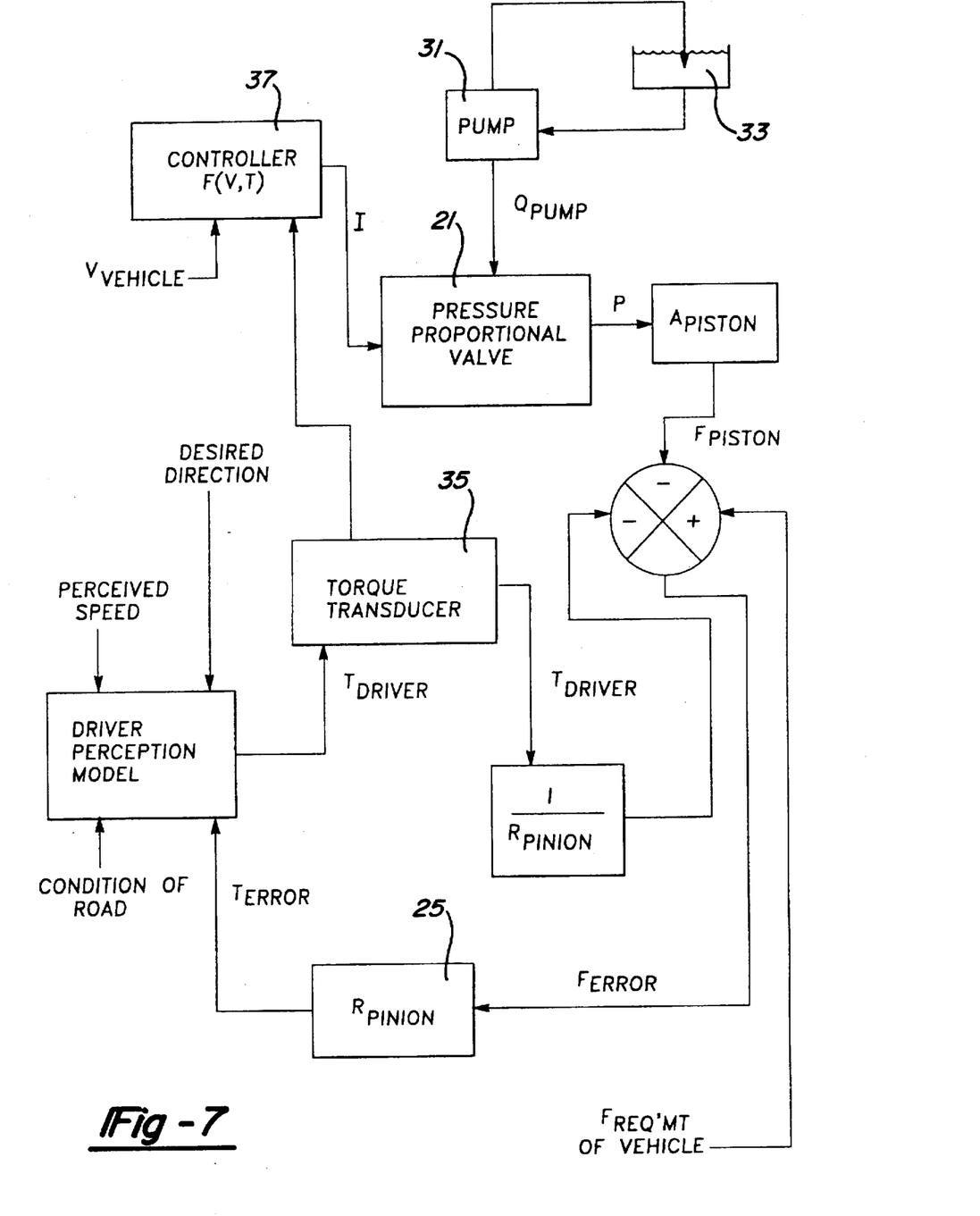
FIG. 7 is a diagrammatic flow chart showing the operational interactions of the preferred embodiment of the present invention power steering system.

Referring to FIGS. 2 and 7, transducer 35 acts as a sensor in detecting steering wheel induced torque upon torsion bar 23 or other rotating members within the steering column. Transducer 35 is of a magnetoelastic variety preferably described within U.S. Pat. Nos. 5,351,555 entitled "Circularly Magnetized Non-Contact Torque Sensor and Method for Measuring Torque Using Same" which issued to Garshelis on Oct. 4, 1994 and 4,896,544 entitled "Magnetoelastic Torque Transducer" which also issued to Garshelis on Jan. 30, 1990. Alternately, transducer 35 can be like that described in U.S. Pat. No. 5,123,279 entitled "Transducer for an Electromotively Driven Power Steering System" which issued to Henein et al. on Jun. 23, 1992; all of these transducer patents are incorporated by reference herewithin. Transducer 35 has a first pair of leads electrically connected to a power supply 501 and a second pair of leads electrically connected for sending a signal to an electrical control unit 37.

Electrical control unit 37 is preferably a microprocessor but may alternately be an analog or other similar controlling device. Electrical control unit 37 also receives a vehicle velocity signal from a device such as a permanent magnet speed sensor (not shown) coupled to a vehicle drive shaft. The vehicle driver turns the steering wheel based on his mental perception model which takes into account the perceived vehicle speed, road condition and desired turning direction. Thus, the vehicle driver supplies a torque, $T_{DRIVER}$, as measured by torque transducer 35. Electrical control unit 37 then calculates a desired solenoid current, I, as a function of the vehicle velocity, $V_{VEHICLE}$, and the transducer signal. Electrical control unit 37 employs various formulas in performing this calculation such as those disclosed in U.S. Pat. No. 4,629,025 entitled "Flow Regulated Power Assist Steering System with Evasive Maneuver Capability" which issued to Brasier et al. on Dec. 16, 1986, and is incorporated by reference herewithin.

The amount of current supplied from electrical control unit 37 to each of the solenoids 201 of valve 21 controls the linear position of the spools. Thus, the full amount of current will cause the solenoids to move in the spools to their closed positions while no current to one solenoid would allow the fluid pressure to move the adjacent spool to its fully open position. However, various intermediate spool positions are achievable depending upon the amount of current supplied to each solenoid.

Depending upon the spool locations, pump 31 supplies a quantity of steering fluid, $Q_{PUMP}$, from reservoir 33 and through valve 21 which, in turn, supplies a proportional pressure, P, to fill an area behind a side of the piston, $A_{PISTON}$. The pressure area behind a side of the piston is measured as a force equal to the fluid pressure times the cylinder area adjacent therebehind. Furthermore, inputs from the inverse pinion rotation, $1/R_{PINION}$, piston force input, $F_{PISTON}$, and the present steering force along the cylinder axis, $F_{REQUIREMENT\ OF\ VEHICLE}$, are added in a hypothetical summing junction. The driver receives feedback of steering feel between the wheels and pinion gear, $F_{ERROR}$, and steering feel based on torque, $T_{ERROR}$. The present invention electronically variable pressure steering system employs the linearly movable pressure proportional control valve for controlling both the direction and degree of pressure of the steering fluid flow instead of the more conventional rotary gear valve having mechanical torsion bar/hydraulic interaction.

With the present invention, the driver is provided with a higher degree of steering feel as compared to traditional mechanically coupled rotary valves since these rotary valves are dependent upon the amount of torque built into the torque bar. The present invention is further advantageous in that by simply changing the electrical control unit software, identical valve constructions can be used for sports car drivers desiring a high degree of torque at fairly low road speeds, larger luxury cars desirous of high torque only at very high rolling speeds and also for any driver preference therebetween. Furthermore, the present invention power steering system provides for solenoid actuated variable assist and even driver/switch selectable assist features within the flow direction control valve. The valve of the present invention further allows for its placement remote from the torsion bar and pinion gears. In other words, the valve can be placed directly upon the steering cylinder thereby beneficially shortening or even eliminating the conduits or hoses coupled therebetween. This would create less hydraulic lag. Unlike with conventional mechanically coupled torsion bar/rotary valve combinations, the present invention significantly reduces unintended differences between left turn and right turn assist efforts and feel based on part tolerance variations and rusty linkages; this turn assist variation problem is solved by employing the electrically coupled valve wherein the transducer and electrical control unit are not affected by steering system part variations and can even be self correcting by measuring the feedback loop so as to easily increase the solenoid current to compensate for such variations. Therefore, individual part fine tuning and machining, in addition to relaxation of the traditionally tight manufacturing tolerances, is possible so as to lead to improved processing and installation efficiencies and piece costs while reducing part scrap and tooling costs. The present invention further provides a torque range between zero and 90 inch-pounds. This system is also easily adaptable for handicapped using a joystick control and autopilot type steering for future automated highway systems.

While the preferred embodiments of this power steering system and control valve have been disclosed, it will be appreciated that various modifications may be made without departing from the present invention. For example, the closure of the spools may be the lower and peripheral surfaces of the lands rather than the poppet. Furthermore, the bores and passageways may be differently oriented or performed through separately applied hoses or housings. Holding, pushing, rotating or other types of electromagnetic devices may be used to move differently configured plungers and spools. Moreover, the spools may have a variety of alternate shapes and passageways therethrough. The valve, electrical control unit and transducer disclosed hereinabove can also be employed with a recirculating ball nut/power piston type gear with a Pitman shaft and a sector gear. Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus for use in a power steering system comprising:

a valve having a left turn assist outlet and a right turn assist outlet, said valve operable for controlling pressure of steering fluid through at least one of said turn assist outlets;

a sensor for detecting steering wheel induced torque, said sensor generating a signal upon detection of said torque; and     said valve selectively varying said pressure as a function of said signal generated by said sensor;

said valve further including:

a body;

a first bore disposed within said body having a first port;

a supply inlet supplying fluid to said first port;

a linearly displaceable first spool disposed in said first bore;

a second port of said first bore communicating with a first one of said turn assist outlets;

a third port in said first bore communicating with a second one of said turn assist outlets;

a return outlet;

a fourth port in said first bore communicating with said return outlet;

a second bore disposed in said body and having a first port communicating with said supply inlet;

a second port in said second bore communicating with a first exchange passageway which communicates with said third port of said first bore;

a third port of said second bore communicating with said second of said turn assist outlets;

a fourth port of said second bore communicating with a second exchange passageway which further communicates with a fifth port in said first bore, said fifth port in said first bore communicating with said second port in said first bore;

a return passageway communicating between said fourth port in said first bore and a fifth port in said second bore; and a sixth port in said second bore communicating with said return outlet.

2. The apparatus of claim 1 wherein said valve further includes a second linearly displaceable spool disposed in said second bore wherein each of said spools comprise:

a lower land having a peripheral surface substantially sealable against a portion of an interior surface of a congruent of said bores;

an upper land having a peripheral surface substantially sealable against a portion of said interior surface of the congruent of said bores;

a bridge coupling said lands together, said bridge having a clearance to said interior surface of the congruent said bores; and a seat interface mounted on said lower land selectively constricting said flow through the congruent of said bores.

3. The apparatus of claim 2 wherein said spools are disposed in a fully open position when substantially equal minimum fluid pressure is desired to exit said turn assist outlets, said fully open position of said spools being defined by:

said seat interfaces fully removed from adjacent seats within said bores thereby allowing said fluid to flow between said first ports and said second ports as well as to said exchanging passageways and through said return passageway and said return outlet;

said lower lands being disposed within each bore between said second and third ports of said first bore and said third and fourth ports of said second bore; and said upper lands disposed to allow fluid flow between said third and fourth ports of said first bore and then through said return passageway, and between said fourth and sixth ports of said second bore, and then out said return outlet.

4. The apparatus of claim 2 wherein at least one of said spools is selectively and linearly movable to create increased steering fluid pressure by constricting flow through the congruent of said bores thereby causing relatively greater fluid pressure supply through the lesser constricted of said bores and said turn assist outlet openly communicating therewith.

5. The apparatus of claim 1 wherein said valve further includes:

a second bore disposed in said body and having a first port therein communicating with said supply inlet by way of said first port of said first bore and a supply passageway communicating with a fifth port of first bore;

a second port in said second bore communicating with a first exchange passageway which communicates with a sixth port of said first bore, said sixth port of said first bore communicating with said third port of said first bore;

a third port of said second bore communicating with a second exchange passageway which further communicates with a seventh port of said first bore, said seventh port of said first bore communicating with said second port of said first bore;

a fourth port of said second bore communicating with said return outlet by way of said fourth port of said first bore and through an eighth port of said first bore and a return passageway; and said supply inlet and said right, left and return outlets all being positioned substantially to one side of said first bore.

6. An apparatus for use in a power steering system comprising:

a valve having a left turn assist outlet and a right turn assist outlet, said valve operable for controlling pressure of steering fluid through at least one of said turn assist outlets;

a sensor for detecting steering wheel induced torque, said sensor generating a signal upon detection of said torque;

said valve selectively varying said pressure as a function of said signal generated by said sensor, said valve further including:

a first spool linearly movable within a first bore for selectively and variably constricting said fluid flowing therethrough;

a first electromagnetic device energizable for controlling the position of said first spool within said first bore as a function of said signal generated by said sensor;

a second spool linearly movable within a second bore for selectively and variably constricting said fluid flowing therethrough; and a second electromagnetic device energizable for controlling the position of said second spool within said second bore as a function of said signal generated by said sensor.

7. The apparatus of claim 6 further comprising an electrical control unit electrically connected for receiving said signal from said sensor and a vehicle speed signal, said electrical control unit further electrically connected to said electromagnetic device for selectively controlling the energization thereof.

8. The apparatus of claim 6 wherein said bores are disposed substantially parallel to each other.

9. The apparatus of claim 6 wherein said valve directly controls direction of said flow of said steering fluid and degree of pressure of said steering fluid.

10. The apparatus of claim 6 wherein said valve is operable for supplying said steering fluid directly from a steering pump to a steering cylinder.

11. A valve for a power steering system comprising:

a body having a first bore and a second bore;

a pair of linearly displaceable spools disposed in said bores, said first bore including a first port;

a supply inlet supplying fluid to said first port;

a linearly displaceable first spool disposed in said first bore;

a second port of said first bore communicating with a first turn assist outlet;

a third port in said first bore communicating with a second turn assist outlet;

a return outlet; and a fourth port in said first bore communicating with said return outlet.

12. The valve of claim 11 further comprising:

a first port of said second bore communicating with said supply inlet;

a second port in said second bore communicating with a first exchange passageway which communicates with said third port of said first bore;

a third port of said second bore communicating with said second of said turn assist outlets;

a fourth port of said second bore communicating with a second exchange passageway which further communicates with a fifth port in said first bore, said fifth port in said first bore communicating with said second port in said first bore;

a return passageway communicating between said fourth port in said first bore and a fifth port in said second bore; and a sixth port in said second bore communicating with said return outlet.

13. The valve of claim 11 further comprising:

a first port of said second bore communicating with said supply inlet by way of said first port of said first bore and a supply passageway communicating with a fifth port of first bore;

a second port in said second bore communicating with a first exchange passageway which communicates with a sixth port of said first bore, said sixth port of said first bore communicating with said third port of said first bore;

a third port of said second bore communicating with a second exchange passageway which further communicates with a seventh port of said first bore, said seventh port of said first bore communicating with said second port of said first bore;

a fourth port of said second bore communicating with said return outlet by way of said fourth port of said first bore and through an eighth port of said first bore and a return passageway; and said supply inlet and said outlets all being positioned substantially to one side of said first bore.

14. The valve of claim 11 further comprising:

a supply inlet;

a left turn assist outlet;

a right turn assist outlet; and a return outlet;

whereby said supply inlet and said outlets are in communication with both of said bores when said pair of spools are open.

15. A valve for a power steering system comprising:

a body having a first bore and a second bore;

a pair of linearly displaceable spools disposed in said bores, each of said pair of spools further including:

a lower land having a peripheral surface substantially sealable against a portion of an interior surface of a congruent of said bores;

an upper land having a peripheral surface substantially sealable against a portion of said interior surface of the congruent of said bores;

a bridge coupling said lands together, said bridge having a clearance to said interior surface of the congruent said bores; and a seat interface mounted on said lower land selectively constricting said flow through the congruent of said bores;

said spools being disposed in a fully open position when substantially equal minimum fluid pressure is desired to exit turn assist outlets, said fully open position of said spools being defined by said closures fully removed from adjacent seats within said bores thereby allowing said fluid to flow therepast.

16. The valve of claim 15 wherein said valve directly controls direction of said flow of steering fluid and degree of pressure of said steering fluid.

17. The valve of claim 15 further comprising a pair of electromagnetic devices controlling linear movement of said pair of spools within said bores.

18. A valve for a power steering system comprising:

a body having a first bore and a second bore; and a pair of linearly displaceable spools disposed in said bores;

wherein each of said pair of spools have elongated hollow lower and upper chambers coaxially running within a congruent bore, said chambers being transversely accessible by apertures.

19. The valve of claim 18 wherein at least one of said spools is selectively and linearly movable to create increased steering fluid pressure by constricting flow through a congruent of said bores thereby causing relatively greater fluid pressure supply through the lesser constricted of said bores and a turn assist outlet openly communicating therewith.

20. The valve of claim 18 wherein said bores are disposed substantially parallel to each other.

21. A power steering system comprising:

a member rotatable in response to steering wheel induced torque;

a pinion gear rotatably coupled to said rotatable member;

a valve directly controlling direction of flow of steering fluid and degree of pressure of said steering fluid, said valve only interfacing with said rotatable member in an electrical and not mechanical manner;

a sensor for detecting steering wheel induced torque, said sensor generating a signal upon detection of said torque; and said valve selectively varying said flow as a function of said signal generated by said sensor, said valve including a body, a pair of bores disposed in said body and a pair of spools linearly movable within said pair of bores.

22. The power steering system of claim 21 wherein said valve further includes a pair of electromagnetic devices positioning said pair of spools within said pair of bores.

23. The power steering system of claim 21 further comprising:

a steering pump;

a steering cylinder having at least part of a rack linearly movable therewithin, said rack enmeshed with said pinion gear for mechanically transmitting rotational movement to linear movement; and said valve directly supplying said steering fluid from said steering pump to said steering cylinder through conduits;

whereby said valve selectively directs and controls the pressure of said steering fluid to assist in left and right turning.

24. A method for operating a single valve assembly in a power steering system comprising the steps of:

(a) supplying steering fluid through a supply inlet and to a first bore within said valve;

(b) moving a first spool within said first bore in a linear manner between a fully opened position and a fully closed position;

(c) allowing a flow of said fluid from said first bore and through a first turn assist outlet when said spool is in any portion of its stroke movement;

(d) blocking flow of said fluid through said first bore from said supply inlet when said spool is in any portion of its stroke movement;

(e) controlling flow of said steering fluid;

(f) controlling a degree of pressure of said steering fluid;

(g) supplying steering fluid through said supply inlet and to a second bore within said valve;

(h) moving a second spool within said second bore in a linear manner between a fully opened position and a fully closed position;

(i) flowing said fluid from said second bore and to a second turn assist outlet when said second spool is in any portion of its stroke movement; and (j) blocking flow of said fluid through said second bore from said supply inlet when said second spool is in any portion of its stroke movement.

25. The method of claim 24 further comprising the step of providing an open passageway from said second turn assist outlet through said first and second bores and out a return outlet when said first spool is in any portion of its stroke movement and said second spool is in said fully open position.

26. The method of claim 24 further comprising the steps of:

(a) detecting steering wheel induced torque by a sensor;

(b) generating a signal upon detection of said torque by said sensor;

(c) receiving said signal of said sensor by an electrical control unit;

(d) receiving a vehicle velocity signal by said electrical control unit;

(e) comparing said torque and velocity signals against preset values within said electrical control unit;

(f) generating electrical current to an electromagnetic device of said valve by said electrical control unit;

(g) incrementally positioning said first spool in response to an amount of current received by said electromagnetic device from said electrical control unit.

27. A method of installing and operating a power steering system comprising the steps of:

(a) providing a rotatable member with a pinion gear coupled to an end thereof;

(b) providing a steering cylinder having a rack linearly movable therein;

(c) enmeshing said pinion gear with said rack;

(d) coupling a valve to said steering cylinder for operably flowing steering fluid directly thereto through conduits;

(e) interfacing said valve with said rotatable member in an electrical and not mechanical manner; and (f) linearly moving a pair of spools incremental distances within said valve thereby controlling direction and pressure of steering fluid flow.

28. The method of claim 27 further comprising the steps of:

(a) providing a left turn assist outlet in said valve; and (b) providing a right turn assist outlet in said valve.

29. An apparatus for use in a power steering system comprising:

a valve having a left turn assist outlet and a right turn assist outlet, said valve operable for controlling pressure of steering fluid through at least one of said turn assist outlets;

a sensor for detecting steering wheel induced torque, said sensor generating a signal upon detection of said torque;

said valve selectively varying said pressure as a function of said signal generated by said sensor, said valve further including:

(a) a first spool movable within a first bore for selectively and variably constricting said fluid flowing through said first bore;

(b) a first electromagnetic device energizable for controlling the position of said first spool within said first bore as a function of said signal generated by said sensor;

(c) a second spool movable within a second bore for selectively and variably constricting said fluid flowing through said second bore; and (d) a second electromagnetic device energizable for controlling the position of said second spool within said second bore as a function of said signal generated by said sensor.

* * * * *